United States Patent
Huang et al.

(10) Patent No.: US 12,092,814 B2
(45) Date of Patent: Sep. 17, 2024

(54) CORRECTING ABERRATION AND APODIZATION OF AN OPTICAL SYSTEM USING CORRECTION PLATES

(71) Applicant: KLA Corporation, Milpitas, CA (US)

(72) Inventors: Haifeng Huang, Livermore, CA (US); Rui-Fang Shi, Cupertino, CA (US); Joseph Walsh, Soquel, CA (US); Mitchell Lindsay, Livermore, CA (US); Eric Vella, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 304 days.

(21) Appl. No.: 17/574,157

(22) Filed: Jan. 12, 2022

(65) Prior Publication Data
US 2022/0244530 A1 Aug. 4, 2022

Related U.S. Application Data

(60) Provisional application No. 63/144,996, filed on Feb. 3, 2021.

(51) Int. Cl.
G02B 27/00 (2006.01)
G02B 27/58 (2006.01)

(52) U.S. Cl.
CPC ......... *G02B 27/0068* (2013.01); *G02B 27/58* (2013.01)

(58) Field of Classification Search
CPC ............... G02B 27/0068; G02B 27/58
USPC ......................................... 359/896
See application file for complete search history.

(56) References Cited

U.S. PATENT DOCUMENTS

| 5,966,243 A | 10/1999 | Braunecker et al. |
| 9,335,206 B2 | 5/2016 | Zhang et al. |
| 10,761,031 B1 | 9/2020 | Zhang et al. |
| 11,156,846 B2 | 10/2021 | Manassen et al. |
| 2004/0100879 A1 | 5/2004 | Ogasawara |

(Continued)

FOREIGN PATENT DOCUMENTS

| JP | 2004138900 A | 5/2004 |
| KR | 1020020012709 A | 2/2002 |

OTHER PUBLICATIONS

International Search Report and Written Opinion in International Application No. PCT/US2022/014177 dated May 6, 2022, 11 pages.

(Continued)

Primary Examiner — Wyatt A Stoffa
Assistant Examiner — Mitchell T Oestreich
(74) Attorney, Agent, or Firm — Suiter Swantz IP

(57) ABSTRACT

An optical system with aberration correction is disclosed. The optical system may include an illumination source. The optical system may include a detector. The optical system may include one or more collection optics configured to image a sample onto the detector based on illumination from the illumination source. The optical system may include two or more aberration correction plates located in one or more pupil planes of the one or more collection optics. The two or more aberration correction plates may provide at least partial correction of two or more linearly-independent aberration terms. Any particular one of the two or more aberration correction plates may have a spatially-varying thickness profile providing a selected amount of correction for a single particular aberration term of the two or more linearly-independent aberration terms.

38 Claims, 9 Drawing Sheets

(56) References Cited

U.S. PATENT DOCUMENTS

2011/0199884 A1* 8/2011 Miyasaka .......... G11B 7/13925
359/290
2015/0293337 A1 10/2015 Matsumoto
2020/0124408 A1 4/2020 Hill et al.

OTHER PUBLICATIONS

"Schmidt corrector plate," Wikipedia, https://en.wikipedia.org/wiki/Schmidt_corrector_plate, Downloaded Jan. 12, 2022, 3 pages.
Naulleau, Patrick P. et al., "Extreme-ultraviolet phase-shifting point-diffraction interferometer: a wave-front metrology tool with subangstrom reference-wave accuracy", Applied Optics, vol. 38, No. 35, Dec. 10, 1999.

* cited by examiner

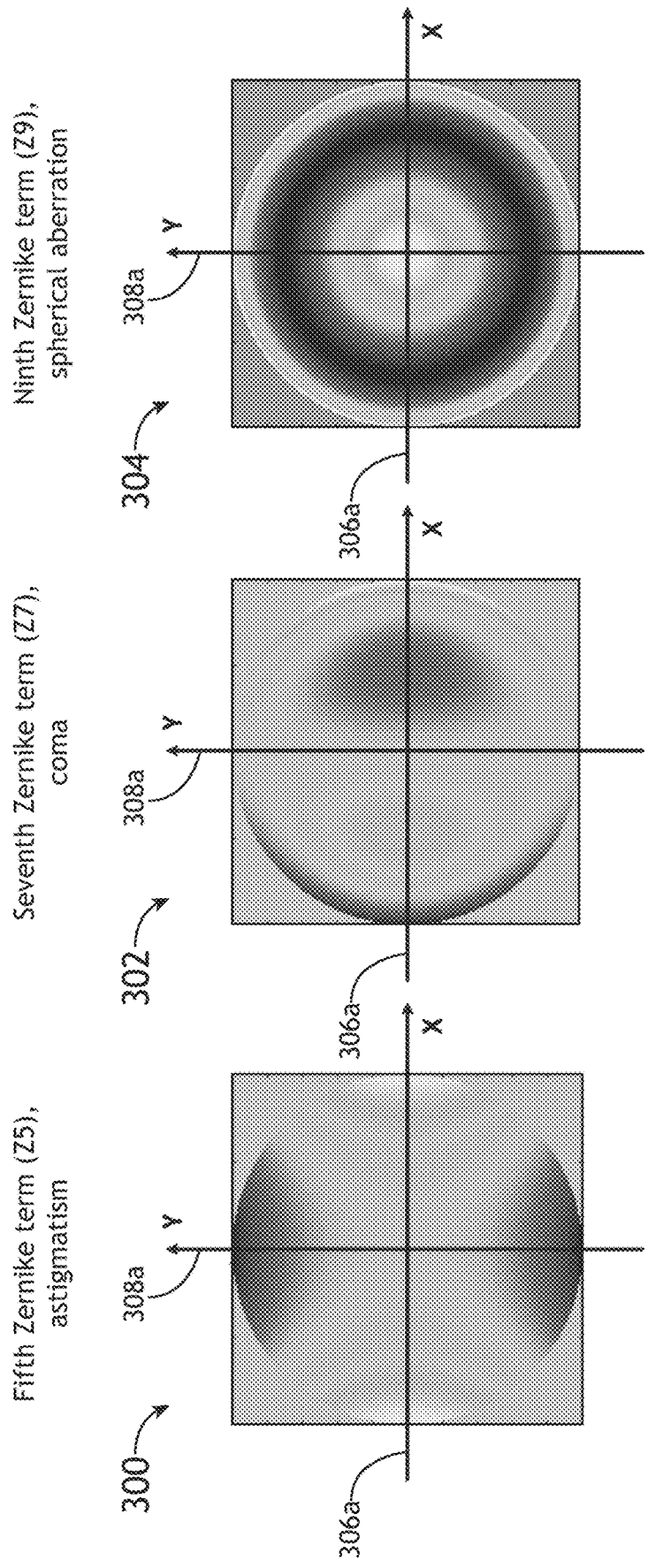

CORRECTING ABERRATION AND APODIZATION OF AN OPTICAL SYSTEM USING CORRECTION PLATES

CROSS-REFERENCE TO RELATED APPLICATION

The present application claims the benefit under 35 U.S.C. § 119(e) of U.S. Provisional Application Ser. No. 63/144,996, filed Feb. 3, 2021, entitled CORRECTION PLATES OF LOW-ORDER ZERNIKE ABERRATIONS AND APODIZATION FOR A HIGH NA IMAGING SYSTEM, naming Haifeng Huang, Rui-Fang Shi, Joseph Walsh, Mitchell Lindsay and Eric Vella as inventors, which is incorporated herein by reference in the entirety.

TECHNICAL FIELD

The present disclosure relates generally to correcting wavefront deformations and, more particularly, to correcting wavefront deformations using one or more aberration correction plates.

BACKGROUND

Optical inspection or metrology in the semiconductor industry may generate measurements based on collected light from a sample using a diffraction-limited and high numerical aperture (NA) system. As semiconductor devices get smaller, the demands on optical inspection or metrology during the manufacturing process become greater. In particular, precise aberration control of the wavefront profile is needed.

SUMMARY

An optical system with aberration correction is disclosed, in accordance with one or more embodiments of the present disclosure. The system includes an illumination source. The system includes a detector. The system includes one or more collection optics configured to image a sample onto the detector based on illumination from the illumination source. The system includes two or more aberration correction plates located in one or more pupil planes of the one or more collection optics and providing at least partial correction of two or more linearly-independent aberration terms, wherein any particular one of the two or more aberration correction plates has a spatially-varying thickness profile providing a selected amount of correction for a single particular aberration term of the two or more linearly-independent aberration terms.

In some embodiments, the system may further comprise at least one apodization correction plate configured to at least partially correct for apodization.

In some embodiments, at least one of the two or more aberration correction plates may be configured to at least partially correct for apodization.

In some embodiments, the at least one of the two or more aberration correction plates may be configured to at least partially correct for apodization, which may be because the at least one of the two or more aberration correction plates may include an apodization coating configured to radially vary the transmissivity according to a radially varying function with increasing transmissivity from a center of a pupil of the optical system relative to an outer edge of the pupil when the at least one aberration correction plate is located at a pupil plane of the optical system.

In some embodiments, the two or more aberration correction plates may include a first aberration correction plate configured to at least partially correct for a first aberration term, the first aberration term characterizing a first type of aberration, and a second aberration correction plate configured to at least partially correct for a second aberration term, the second aberration term characterizing a second type of aberration. In some embodiments, at least one of the first type of aberration or the second type of aberration may be one of astigmatism, coma, spherical aberration, or trefoil aberration.

In some embodiments, the two or more aberration correction plates may further include a third aberration correction plate configured to at least partially correct for a third aberration term of the two or more linearly-independent aberration terms. In some embodiments, the third aberration term may characterize a third type of aberration of the optical system, where the third type of aberration, the second type of aberration, and the first type of aberration are different.

In some embodiments, the third type of aberration may be spherical aberration.

In some embodiments, the first aberration correction plate may be configured to at least partially correct for the first aberration term when the first aberration correction plate is located at the one or more pupil planes of the optical system and the second aberration correction plate may be configured to at least partially correct for the second aberration term when the second aberration correction plate is located at the one or more pupil planes of the optical system.

In some embodiments, the first aberration correction plate may be configured to at least partially correct for the first aberration term when the first aberration correction plate is located at a first pupil plane of the one or more pupil planes and the second aberration correction plate may be configured to at least partially correct for the second aberration term when the second aberration correction plate is located at a second pupil plane of the one or more pupil planes, which may be different than the first pupil plane.

In some embodiments, each of the two or more linearly-independent aberration terms may be Zernike terms.

In some embodiments, each of the two or more linearly-independent aberration terms may be low order Zernike terms spanning a fifth Zernike term up to and including a ninth Zernike term.

In some embodiments, the optical system may be an imaging tool.

In some embodiments, any aberration correction plate that includes an aberration term characterizing an aberration type of astigmatism, coma, or trefoil aberration may be configured to be rotated to align with an orientation of the aberration type in the optical system.

In some embodiments, any aberration correction plate located in one or more pupil planes may be located within a distance range from the one or more pupil planes, wherein the distance range may be configured to provide aberration correction within a selected tolerance.

A system with aberration correction is disclosed, in accordance with one or more embodiments of the present disclosure. The system includes an illumination source. The system includes a detector. The system includes one or more collection optics configured to image a sample onto the detector based on illumination from the illumination source. The system includes a catalog of aberration correction plates. The catalog includes two or more sets. Each set of the two or more sets includes two or more aberration correction plates providing at least partial correction of a specific linearly-independent aberration term. Any particular one of the two or more aberration correction plates has a spatially-varying thickness profile providing a selected amount of correction for the specific linearly-independent aberration term of two or more linearly-independent aberration terms. Each set corrects for a different specific linearly-independent aberration term. The optical system includes a selected combination of two or more aberration correction plates to at least partially correct for aberrations within a selected tolerance. Each aberration correction plate of the selected combination is an aberration correction plate from one of the two or more sets.

In some embodiments, the catalog may further comprise an apodization set configured to at least partially correct for apodization and the selected combination may include an apodization correction plate of the apodization set.

In some embodiments, at least one aberration correction plate of the selected combination may be configured to at least partially correct for apodization.

In some embodiments, the at least one aberration correction plate may be configured to at least partially correct for apodization because the at least one aberration correction plate, in at least one embodiment, may include an apodization coating that may be configured to radially vary the transmissivity according to a radially varying function with increasing transmissivity from a center of a pupil of the optical system relative to an outer edge of the pupil when the at least one aberration correction plate is located at a pupil plane of the optical system.

In some embodiments, the selected combination may be adjustable to provide for different configurations of the optical system.

In some embodiments, the optical system may be an imaging tool.

In some embodiments, the plurality of aberration term may include astigmatism.

In some embodiments, the plurality of aberration term may include coma.

A method of correcting aberration of an optical system is disclosed, in accordance with one or more embodiments of the present disclosure. The method includes determining a wavefront aberration of the optical system. The method includes providing two or more aberration correction plates for the optical system. Each of the two or more aberration correction plates is configured to at least partially correct for an aberration term of a plurality of aberration terms. Each of the plurality of aberration terms is configured to be linearly independent from each other and characterize a type of aberration, each aberration term characterizing a type of aberration of the optical system and being based on the determined wavefront aberration.

In some embodiments, at least one aberration correction plate of the two or more aberration correction plates may be configured to at least partially correct for apodization.

In some embodiments, the at least one aberration correction plate may be configured to at least partially correct for apodization because the at least one aberration correction plate may comprise an apodization coating which may be configured to radially vary the transmissivity according to a radially varying function with increasing transmissivity from a center of a pupil of the optical system relative to an outer edge of the pupil when the at least one aberration correction plate is located at a pupil plane of the optical system.

In some embodiments, the determining may include measuring a wavefront aberration of the optical system.

In some embodiments, the determining may include simulating a wavefront aberration of the optical system.

In some embodiments, each of the plurality of aberration terms may be Zernike terms.

In some embodiments, the plurality of aberration terms may include at least one of astigmatism, coma, spherical aberration, or trefoil aberration.

In some embodiments, a first type of aberration of a first aberration correction plate of the two or more aberration correction plates may be one of astigmatism, coma, spherical aberration, or trefoil aberration.

In some embodiments, a second type of aberration of a second aberration correction plate of the two or more aberration correction plates may be one of astigmatism, coma, spherical aberration, or trefoil aberration.

In some embodiments, the first type of aberration of the first aberration correction plate may be astigmatism. For example, in some embodiments, an amplitude of the first aberration correction plate may be based on a square root of sum of squares of a fifth Zernike term of astigmatism and a sixth Zernike term of astigmatism may be based on the determined wavefront aberration of the optical system, such that the first aberration correction plate may be configured to at least partially correct for both the fifth Zernike term and the sixth Zernike term when located at a pupil plane of the optical system and rotated to align with an orientation of the first type of aberration in the optical system.

In some embodiments, the second type of aberration of the second aberration correction plate may be coma. For example, in some embodiments, an amplitude of the second aberration correction plate may be based on a square root of sum of squares of a seventh Zernike term of coma and an eighth Zernike term of coma may be based on the determined wavefront aberration of the optical system, such that the second aberration correction plate may be configured to at least partially correct for both the seventh Zernike term and the eighth Zernike term when located at a pupil plane of the optical system and rotated to align with an orientation of the second type of aberration in the optical system.

In some embodiments, the optical system may be an imaging tool.

In some embodiments, the method may further include providing an apodization correction plate configured to at least partially correct for apodization.

An optical system with aberration correction is disclosed, in accordance with one or more embodiments of the present disclosure. The system includes an illumination source. The system includes a detector. The system includes one or more collection optics configured to image a sample onto the detector based on illumination from the illumination source. The system includes one or more aberration correction plates located in one or more pupil planes of the one or more collection optics and providing at least partial correction of one or more linearly-independent aberration terms, where any particular one of the one or more aberration correction plates has a spatially-varying thickness profile providing a selected amount of correction for a single particular aberration term of the one or more linearly-independent aberration terms. The one or more aberration correction plates includes a first aberration correction plate configured to at least partially correct for a first aberration term, the first aberration term characterizing a first type of aberration, where the first type of aberration is one of astigmatism, coma, or trefoil aberration, where any aberration correction plate comprising an aberration term characterizing an aberration type of astigmatism, coma, or trefoil aberration is configured to be rotated to align with an orientation of the aberration type in the optical system.

A system with aberration correction is disclosed, in accordance with one or more embodiments of the present disclosure. The system includes an illumination source. The system includes a detector. The system includes one or more collection optics configured to image a sample onto the detector based on illumination from the illumination source. The system includes a catalog of aberration correction plates. The catalog includes one or more sets. Each set of the one or more sets includes one or more aberration correction plates providing at least partial correction of a specific linearly-independent aberration term. Any particular one of the one or more aberration correction plates has a spatially-varying thickness profile providing a selected amount of correction for the specific linearly-independent aberration term of one or more linearly-independent aberration terms. Each set corrects for a different specific linearly-independent aberration term. Each specific linearly-independent aberration term characterizes a type of aberration of one or more types of aberration, wherein each type of aberration of the one or more types of aberration is one of astigmatism, coma, or trefoil aberration. The optical system includes a selected combination of one or more aberration correction plates to at least partially correct for aberrations within a selected tolerance. Each aberration correction plate of the selected combination is an aberration correction plate from one of the one or more sets, where any aberration correction plate comprising an aberration term characterizing an aberration type of astigmatism, coma, or trefoil aberration is configured to be rotated to align with an orientation of the aberration type in the optical system.

A method of correcting aberration of an optical system is disclosed, in accordance with one or more embodiments of the present disclosure. The method includes determining a wavefront aberration of the optical system. The method includes providing one or more aberration correction plates for the optical system. Each of the one or more aberration correction plates is configured to at least partially correct for an aberration term of one or more aberration terms. Each of the one or more aberration terms is configured to be linearly independent from each other and characterize a type of aberration, each aberration term characterizing a type of aberration of the optical system and being based on the determined wavefront aberration. The one or more aberration correction plates comprise a first aberration correction plate configured to at least partially correct for a first aberration term. The first aberration term characterizing a first type of aberration, where the first type of aberration is one of astigmatism, coma, or trefoil aberration, and where any aberration correction plate comprising an aberration term characterizing an aberration type of astigmatism, coma, or trefoil aberration is configured to be rotated to align with an orientation of the aberration type in the optical system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures.

FIG. 3A illustrates a fifth Zernike term wavefront of astigmatism, in accordance with one or more embodiments of the present disclosure.

FIG. 3B illustrates a seventh Zernike term wavefront of coma, in accordance with one or more embodiments of the present disclosure.

FIG. 3C illustrates a ninth Zernike term wavefront of spherical aberration, in accordance with one or more embodiments of the present disclosure.

DETAILED DESCRIPTION

Figure 1A:
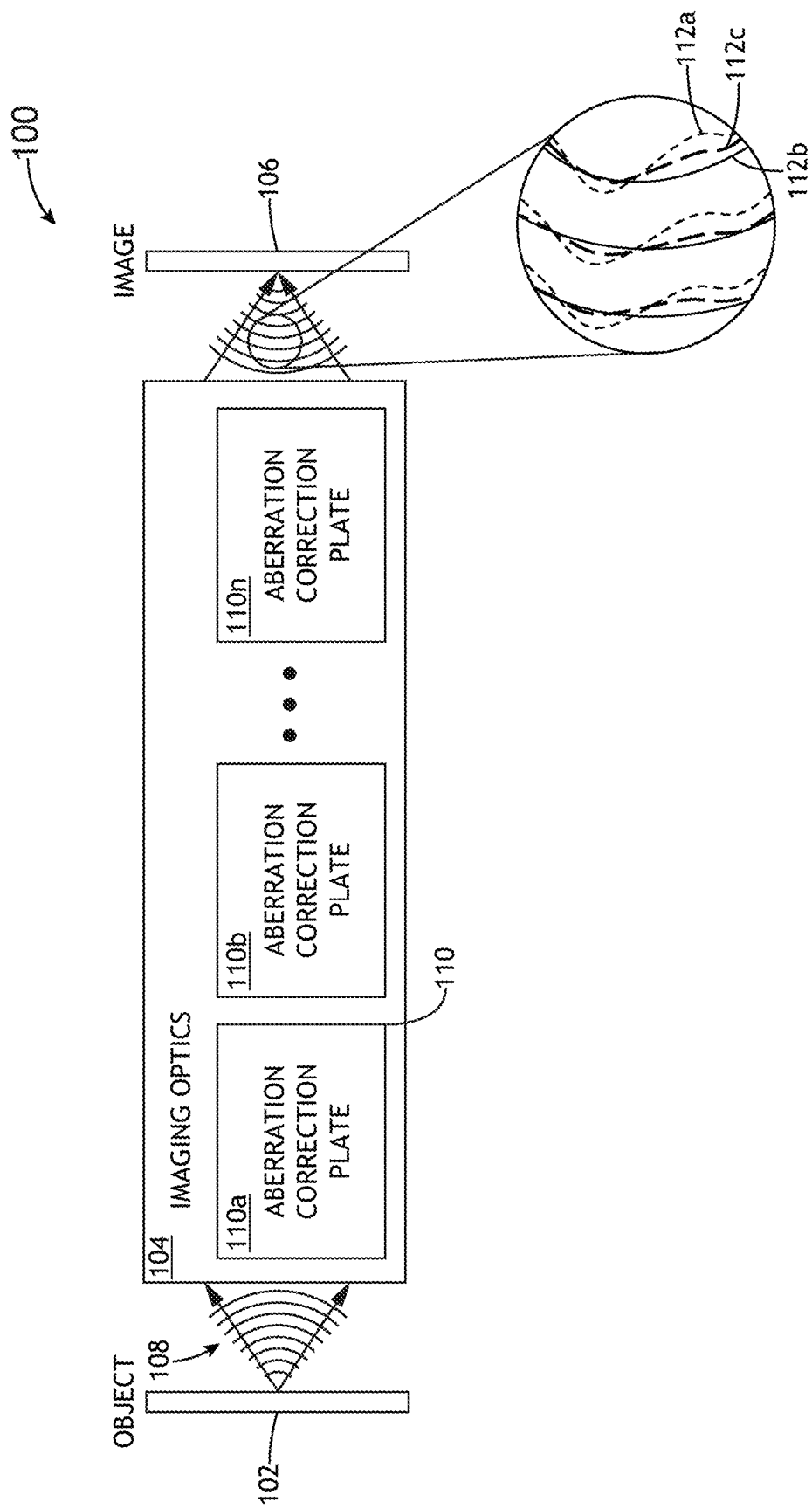
FIG. 1A illustrates a diagrammatic representation of using one or more aberration correction plates to at least partially correct for wavefront aberration of an optical system, in accordance with one or more embodiments of the present disclosure.

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Referring generally to FIGS. 1 through 5B, systems and methods for correcting aberration and/or apodization of an optical system are disclosed, in accordance with one or more embodiments of the present disclosure. Embodiments of the present disclosure are directed to providing one or more aberration and/or apodization correction plates configured to at least partially correct for a wavefront aberration and/or apodization of an optical system, where each aberration correction plate corrects for a different aberration term. Additional embodiments of the present disclosure are directed to one or more aberration correction plates, where each plate provides a selected amount of correction of a single aberration type. Further embodiments are directed to optical systems including a first and second aberration correction plate, where the first and second aberration correction plate correct for a different aberration term characterizing a different aberration type of the optical system.

Further embodiments are directed to systems for correcting aberration of an optical system including a catalog of aberration and/or apodization correction plates that may be used to flexibly tailor aberration and/or apodization correction for an optical system. For example, some embodiments of the present disclosure are directed to a system including a catalog having one or more sets of two or more aberration correction plates (which may, in addition or solely, correct for apodization) in each set, where each set is associated with an aberration term (e.g., astigmatism, coma, and the like) and corrects for a range of values of that aberration term (e.g., a first plate to correct for 20 milli-wave (mWave) value of astigmatism, a second plate to correct for 40 mWave of astigmatism, etc.).

Wavefront metrology and control is generally a critical consideration for high-resolution optical systems operating near the diffraction limit. Undesirable optical aberration present in the optical system will cause image deformation, as well as image contrast reduction and Strehl loss. Therefore, optical aberration is closely linked to the system performance and quality of the optical system.

Generally, circular wavefront aberration profiles may be mathematically modeled using Zernike polynomials. Zernike polynomials are orthogonal over a circle having a unit radius. A complex wavefront aberration may be fitted with Zernike polynomials to yield a set of fitting coefficients that each represent different, linearly independent types of aberrations. Thus, each Zernike term (i.e., a Zernike polynomial multiplied by its respective coefficient) may separately, and in isolation, quantify an aberration type that contributes to an overall wavefront aberration. It is noted that there may be both even and odd Zernike polynomials.

It is noted herein that it may be possible to correct for multiple aberrations in an optical system using a single element. For example, correcting multiple aberrations using a single aberration correction plate is described generally in U.S. Pat. No. 10,761,031, entitled "ARBITRARY WAVEFRONT COMPENSATOR FOR DEEP ULTRAVIOLET (DUV) OPTICAL IMAGING SYSTEM," which is incorporated herein by reference in its entirety. In another example, simultaneously correcting for focus (Z4) and astigmatism (Z5 and Z6) using dependent combinations of at least two plates is described generally in U.S. Pat. No. 5,966,243, entitled "PROCESS FOR CORRECTING WAVE FRONT DEFORMATIONS," issued Oct. 12, 1999, which is incorporated herein by reference in its entirety. However, it is contemplated herein that this approach may have limitations. For example, a single aberration correction plate that corrects for a variety of types of aberration (e.g., coma, astigmatism, and the like) of an optical system may be essentially customized to that system. It may not be practical to have a set of single aberration correction plates that could each simultaneously correct for all possible combinations of the range of all possible values of each type of aberration. Therefore, a single aberration correction plate that simultaneously corrects for a variety of types of aberrations may be essentially tied to the unique, individual optical system it was designed for. Any change to the optical system may cause a change to the wavefront aberration of the optical system, which may require a different aberration correction plate, increasing costs and causing significant delay. For example, as aberration tolerance requirements become more stringent, production costs and lead times of important components may increase, such as for a high numerical aperture (NA) objective. Moreover, if the optical aberration of the objective is out of tolerance requirements, swapping out components to reduce aberration may be costly and cause significant delays.

Some embodiments are directed to systems and methods for correcting aberration of an optical system that addresses at least some of these concerns. For example, in some applications, it may be possible to provide an optical system capable of generating an aberration-corrected image using one or more aberration correction plates. In this example, a change to the wavefront aberration of the optical system may be at least partially corrected for with one or more correction plates which may not be uniquely designed for the optical system. For instance, the wavefront aberration of an optical system may be at least partially corrected for by the use of one or more aberration correction plates, each aberration correction plate correcting for a different, linearly independent aberration term of the wavefront aberration.

In this regard, or by way of another example, a catalog of aberration correction plates may be used, where the catalog includes at least one set of correction plates that all correct for different amounts of a particular aberration term. As an illustration, a catalog may include a set of aberration correction plates to correct for astigmatism, where each plate provides a different amount of correction (e.g., 5 mWave, 10 mWave, 15 mWave, or the like). In this way, astigmatism in a particular optical system may be corrected within a selected tolerance by utilizing (or selecting) a plate providing the required amount of correction. Additionally, a catalog may include multiple (e.g., two or more) sets of correction plates, where each set provides correction for a different aberration term. Accordingly, complex aberrations in an optical system may be corrected within a selected tolerance by utilizing (or selecting) multiple plates from different sets.

It is noted that apodization is the variation of light transmission across the pupil. A highly uniform pupil transmission corresponds to a small apodization. A small apodization is desired for a high NA system because a large apodization reduces the effective NA of the system. It is noted that the apodization (i.e., pupil transmission) of a high NA optical system may show higher transmission near a pupil center than near a pupil edge of the optical system.

At least some embodiments of the present disclosure include apodization correction plates, which may be aberration correction plates with apodization correction.

In regards to apodization, as further described in an optional step below, in at least some embodiments, at least one aberration correction plate (e.g., 118a) in the catalog of aberration correction plates may have an apodization coating on at least one surface of the aberration correction plate. For example, the apodization coating may be configured to at least partially correct for a non-uniformity of the pupil transmission of an optical system.

For example, each aberration correction plate of a set may at least partially correct for a specific value of a range of values of a specific aberration term, and the set may span the range of values of the specific aberration term. For example, a change in an optical system may cause a change in the wavefront aberration of the optical system. Further, in regards to this example, the wavefront aberration may at least partially be corrected for by substituting a pre-existing aberration correction plate of the optical system having a specific value of a specific aberration term with a selected aberration correction plate having a different value of the same aberration term. In another embodiment of this example, the selected aberration correction plate may be used without substituting out a preexisting aberration correction plate. Further, in regards to this example, the selected aberration correction plate may already be in inventory and/or manufactured in volume such that the cost of such an aberration correction plate is relatively low and the lead time is relatively low. Benefits of such a system or method at least allow for, in at least some embodiments, the ability to possess a catalog of aberration correction plates (or purchase in relatively short time one or more aberration correction plates) that covers one or more aberration types (e.g., coma, astigmatism, spherical aberrations, and the like) to allow for quickly changing out (or adding) aberration correction plates in an optical system in response to a change in the wavefront aberration of the optical system. Further, such a system and method at least allow for, in some embodiments, lowering the costs of correcting for aberration of an optical system due to such aberration correction plates being able to be used in more than one system and manufactured in volume and/or being easier to manufacture than a single plate that corrects for a variety of aberration terms.

At least some embodiments of the present disclosure include aberration correction plates usable in an optical system (e.g., insertable at the pupil plane). For example, the aberration correction plates may be a thin transparent plate with a varying 2-dimensional (2D) thickness that is configured to be used in an optical system (e.g., an image system) at or near its pupil plane. For instance, the 2D thickness may be modified by ion-beam figuring (IBF) technology or other profile defining technologies or methods such that the transmitted wavefront profile from the aberration correction plate cancels out (e.g., corrects for) at least a portion of the aberration of the optical system when the plate orientation (i.e., rotation about the optical axis of the optical system) is correct or nearly correct. In this regard, the aberration correction plate may be spatially modifying the optical path across the pupil to cancel out (e.g., compensate for) wavefront aberrations.

Additionally, it is noted that optical systems with aberration correction may be utilized in a wide range of applications. Accordingly, the spirit and scope of the present disclosure is not limited to high NA or high-resolution metrology systems and may extend to any application of an optical system with one or more aberration correction plates.

FIG. 1A is a diagrammatic representation of an optical system with aberration correction, in accordance with one or more embodiments of the present disclosure. In one embodiment, the optical system 100 includes, as shown in FIG. 1, one or more aberration correction plates 110 (e.g., a first aberration correction plate 110a, and, optionally, a second aberration correction plate 110b, up to and including an Nth aberration correction plate 110n) which may each correct for an aberration term. For example, as shown, the optical system 100 may include imaging optics 104, which may include any suitable number and type of imaging optics. As shown, an optical system may be configured to image an object 102 to form an image 106 by the use of electromagnetic waveforms (e.g., light from an illumination source), which may be reflected from or transmitted through the object 102 (e.g., from an illumination source located behind the object 102) and may be represented by a plurality of wavefronts 108. The light may pass through any number and type of imaging optics 104. Each element of the imaging optics 104 may introduce aberrations into the system, which may cause the wavefront to be distorted compared to an ideal non-distorted wavefront 112b, as shown by distorted wavefront 112a. For instance, imperfections in the element or inaccurate placement or orientation of an element of the imaging optics 104 may cause aberrations that distort the wavefronts 108. Further, the design of the optical system 100 itself may introduce aberrations (e.g., unavoidable for a given set of design constraints, even with perfect imaging optics 104). The one or more aberration correction plates 110 may be used to compensate for (i.e., correct for) such a distorted wavefront 112a. The one or more aberration correction plates 110 may cause a distorted wavefront 112a to match an ideal non-distorted wavefront 112b more closely, as shown by partially corrected wavefront 112c. At least some benefits of at least partially corrected wavefront 112c may include being able to meet stricter aberration tolerance requirements, being able to produce a clearer image, and/or being able to produce a more accurate and less deteriorated image of object 102. Other benefits at least include being able to correct for residual wavefront error caused by manufacturing steps of an optical system.

In regards to apodization, as further described in an optional step below, in at least some embodiments, at least one aberration correction plate (e.g., 110a) of the aberration correction plates 110 of the optical system 100 may have an apodization coating on at least one surface of the aberration correction plate 110. For example, the apodization coating may be configured to at least partially correct for a non-uniformity of the pupil transmission of the optical system 100. In another example, the apodization coating may be configured to have a lower transmissivity (e.g., a lower transmissivity near the center (e.g., optical axis) than the edges). In another example, the apodization coating may be configured to radially vary the transmissivity according to a radially varying function with increasing transmissivity from a center of the pupil.

Figure 1B:
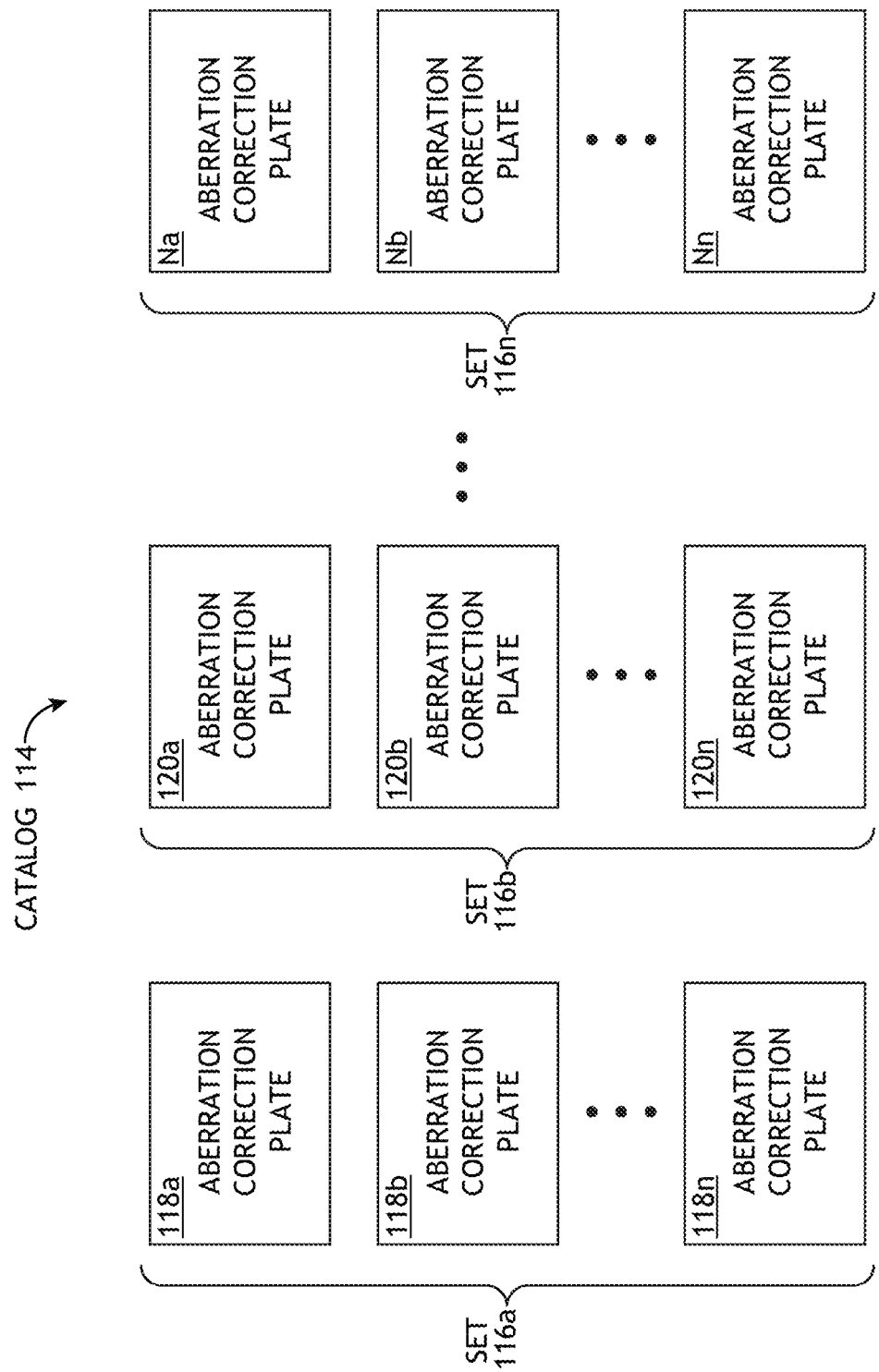
FIG. 1B illustrates a diagrammatic representation of a catalog of one or more sets of aberration correction plates configured to at least partially correct for wavefront aberration of an optical system, in accordance with one or more embodiments of the present disclosure.

FIG. 1B is a diagrammatic representation of a catalog 114 of one or more sets 116 (e.g., a first set 116a, and optionally a second set 116b, up to an N number of sets) of aberration correction plates (e.g., aberration correction plate 118a of the first set 116a, aberration correction plate 118b of the first set 116a, up to an Nth aberration correction plate of the first set 116a) configured to at least partially correct for wavefront aberration of an optical system (e.g., optical system 100 of FIG. 1A), in accordance with one or more embodiments of the present disclosure. In one embodiment, each set 116 is configured to at least partially correct for an aberration term that is associated with each set. For example, each aberration term may be linearly independent from each of the other aberration terms and may be configured to characterize a type of aberration. For instance, each aberration correction plate 118 of the first set 116a may be configured to at least partially correct for an aberration term associated with and characterizing astigmatism and each aberration correction plate 120 of the second set 116b may be configured to at least partially correct for an aberration term associated with and characterizing coma. In this regard, the first aberration correction plate 118a of the first set 116a may correct a value of 20 mWave of astigmatism, the second plate 118b may correct a value of 40 mWave of astigmatism, and this pattern may continue for the other aberration correction plates 118 in the first set 116a. Likewise, a range of values of coma may be corrected for by the aberration correction plates 120 in the second set 116b. It is noted that the above examples are provided merely for illustrative purposes and sets may be associated with any aberration term and any aberration type. For example, not including other examples of aberration terms and aberration types may be for purposes of brevity only. For example, catalog 114 may include set 116a that is associated with any linearly independent aberration term or aberration type. In another example, catalog 114 may include set 116a that is associated with any Zernike term.

In another embodiment, at least one of the aberration correction plates (e.g., 118a) in the catalog 114 may be configured to be used in an optical system (e.g., the optical system 100 of FIG. 1A or the imaging tool 122 of FIG. 1C, as is discussed in more detail below). For example, aberration correction plate 118a may be configured to be inserted into an optical system 100. In another example, aberration correction plate 118a may be configured to be inserted into one or more pupil planes of an optical system 100. In another example, an aberration correction plate 110 from one or more of the one or more sets 116 (e.g., one aberration correction plate 110 from each set) may be selected for, utilized by, or inserted into the optical system 100. For example, an aberration correction plate 118 from the first set 116a may be selected and may be the aberration correction plate 110a shown in FIG. 1A. Further, in regards to this example, an aberration correction plate 120 from the second set 116b may be selected and may be the aberration correction plate 110b. In this regard, if the first set 116a at least partially corrects for astigmatism and the second set 116b at least partially corrects for coma, then using a combination of an aberration correction plate 110 from each set 116 would at least partially correct for both astigmatism and coma.

Referring again to FIG. 1B, a system for correcting aberration of an optical system is disclosed. For example, the system may include a catalog. For instance, the catalog may include one or more sets. In this regard, the sets may include multiple (e.g., two or more) aberration correction plates. For example, each of the multiple aberration correction plates of a set may be configured to at least partially correct for a range of preset catalog values of an aberration term that is associated with the set. For instance, each aberration term may be configured to be linearly independent from each other and characterize a type of aberration (e.g., astigmatism, coma, spherical aberration, and the like).

In this regard, a catalog of an astigmatism set of aberration correction plates, a coma set of aberration correction plates, and a spherical aberration set of aberration correction plates may exist. In addition, the astigmatism set of aberration correction plates may include a first aberration correction plate of 20 mWave, a second aberration correction plate of 40 mWave, a third aberration correction plate of 60 mWave, and the like. Similarly, the coma set of aberration correction plates may include a first aberration correction plate of 10 mWave, a second aberration correction plate of 20 mWave, a third aberration correction plate of 30 mWave, and the like. Similarly, the spherical aberration set of aberration correction plates may likewise span a range of preset catalog values. The aberration correction plates of each set may be configured to be used or selected for use in an optical system 100 to at least partially correct for the aberration types associated with each set. In addition, if an aberration type does not exist or is below a threshold (e.g., 5 mWave) then it may be determined that no aberration correction plate from the set associated with such an aberration type shall be used in the optical system 100.

Figure 1C:
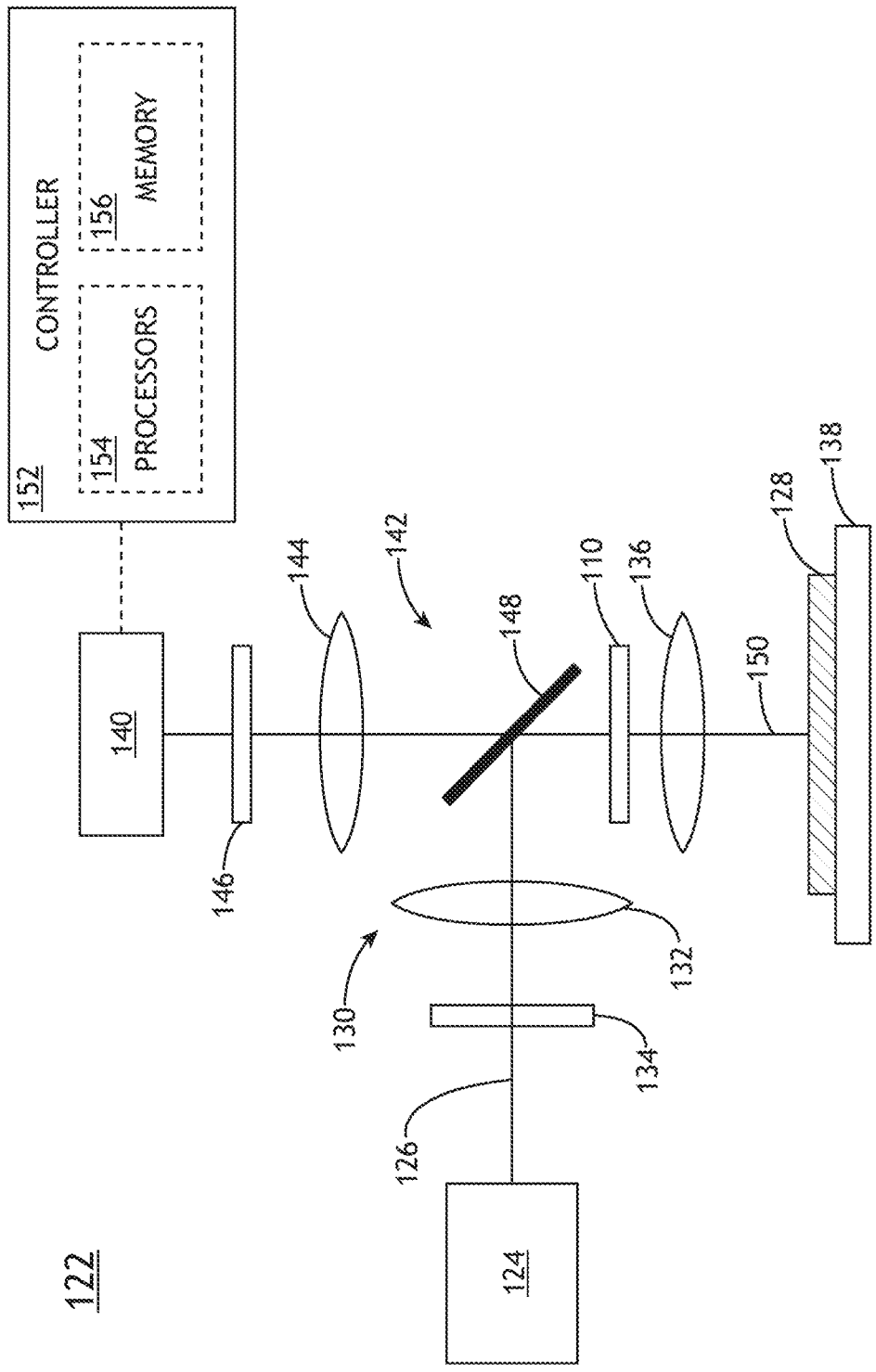
FIG. 1C illustrates a diagrammatic representation of an imaging tool, in accordance with one or more embodiments of the present disclosure.

FIG. 1C is a conceptual view illustrating an imaging tool 122, in accordance with one or more embodiments of the present disclosure. In one embodiment, the imaging tool 122 includes an illumination source 124 configured to generate at least one illumination beam 126. The illumination from the illumination source 124 may include one or more selected wavelengths of light including, but not limited to, ultraviolet (UV) radiation, visible radiation, or infrared (IR) radiation. For example, the imaging tool 122 may include one or more apertures at an illumination pupil plane to divide illumination from the illumination source 124 into one or more illumination beams 126 or illumination lobes. In this regard, the imaging tool 122 may provide dipole illumination, quadrature illumination, or the like. Further, the spatial profile of the one or more illumination beams 126 on the sample 128 may be controlled by a field-plane stop to have any selected spatial profile.

The illumination source 124 may include any type of illumination source suitable for providing at least one illumination beam 126. In one embodiment, the illumination source 124 is a laser source. For example, the illumination source 124 may include, but is not limited to, one or more narrowband laser sources, a broadband laser source, a supercontinuum laser source, a white light laser source, or the like. In this regard, the illumination source 124 may provide an illumination beam 126 having high coherence (e.g., high spatial coherence and/or temporal coherence). In another embodiment, the illumination source 124 includes a laser-sustained plasma (LSP) source. For example, the illumination source 124 may include, but is not limited to, a LSP lamp, a LSP bulb, or a LSP chamber suitable for containing one or more elements that, when excited by a laser source into a plasma state, may emit broadband illumination. In another embodiment, the illumination source 124 includes a lamp source. For example, the illumination source 124 may include, but is not limited to, an arc lamp, a discharge lamp, an electrode-less lamp, or the like. In this regard, the illumination source 124 may provide an illumination beam 126 having low coherence (e.g., low spatial coherence and/or temporal coherence). In another embodiment, the illumination source 124 includes a high-brightness illumination source formed from multiple coherent sources into a single output distribution. For example, a high-brightness illumination source including multiple coherent sources configured to provide a single output distribution in a common etendue is generally described in U.S. patent application Ser. No. 16/430,861 filed on Jun. 4, 2019, which is incorporated herein by reference in its entirety.

The illumination source 124 may provide an illumination beam 126 using free-space techniques and/or optical fibers. In one embodiment, the illumination source 124 generates a multi-lobe illumination beam 126 by providing light in two or more optical fibers, where light output from each optical fiber is an illumination lobe of the illumination beam 126. In another embodiment, the illumination source 124 generates a multi-lobe illumination beam 126 by diffracting a light source into two or more diffraction orders, where the illumination lobes of the illumination beam 126 are formed from at least some of the diffraction orders of the light source. Efficient generation of multiple illumination lobes through controlled diffraction is generally described in U.S. Patent Publication No. US2020/0124408 published on Mar. 14, 2019 and titled Efficient Illumination Shaping for Scatterometry Overlay, which is incorporated herein by reference in its entirety.

In another embodiment, the imaging tool 122 directs the illumination beam 126 to the sample 128 via an illumination pathway 130. The illumination pathway 130 may include one or more optical components suitable for modifying and/or conditioning the illumination beam 126 as well as directing the illumination beam 126 to the sample 128. In one embodiment, the illumination pathway 130 includes one or more illumination-pathway lenses 132 (e.g., to collimate the illumination beam 126, to relay pupil and/or field planes, or the like). In another embodiment, the illumination pathway 130 includes one or more illumination-pathway optics 134 to shape or otherwise control the illumination beam 126. For example, the illumination-pathway optics 134 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

In another embodiment, the imaging tool 122 includes an objective lens 136 to focus the illumination beam 126 onto the sample 128 (e.g., a target with target elements located on two or more layers of the sample 128). In another embodiment, the sample 128 is disposed on a sample stage 138 suitable for securing the sample 128 and further configured to position the sample 128 with respect to the illumination beam 126.

In another embodiment, the imaging tool 122 includes one or more detectors 140 configured to capture light or other emanating from the sample 128 (e.g., an target on the sample 128) (e.g., collected light 150) through a collection pathway 142. The collection pathway 142 may include one or more optical elements suitable for modifying and/or conditioning the collected light 150 from the sample 128. In one embodiment, the collection pathway 142 includes one or more collection-pathway lenses 144 (e.g., to collimate the illumination beam 126, to relay pupil and/or field planes, or the like), which may include, but is not required to include, the objective lens 136. In another embodiment, the collection pathway 142 includes one or more collection-pathway optics 146 to shape or otherwise control the collected light 150. For example, the collection-pathway optics 146 may include, but are not limited to, one or more field stops, one or more pupil stops, one or more polarizers, one or more filters, one or more beam splitters, one or more diffusers, one or more homogenizers, one or more apodizers, one or more beam shapers, or one or more mirrors (e.g., static mirrors, translatable mirrors, scanning mirrors, or the like).

A detector 140 may be located at any selected location within the collection pathway 142. In one embodiment, the imaging tool 122 includes a detector 140 at a field plane (e.g., a plane conjugate to the sample 128) to generate an image of the sample 128. In another embodiment, the imaging tool 122 includes a detector 140 at a pupil plane (e.g., a diffraction plane) to generate a pupil image. In this regard, the pupil image may correspond to an angular distribution of light from the sample 128 detector 140. For instance, diffraction orders associated with diffraction of the illumination beam 126 from the sample 128 (e.g., an target on the sample 128) may be imaged or otherwise observed in the pupil plane. In a general sense, a detector 140 may capture any combination of reflected (or transmitted), scattered, or diffracted light from the sample 128.

The imaging tool 122 may generally include any number or type of detectors 140 suitable for capturing light from the sample 128 indicative of overlay. In one embodiment, the detector 140 includes one or more detectors 140 suitable for characterizing a static sample. In this regard, the imaging tool 122 may operate in a static mode in which the sample 128 is static during a measurement. For example, a detector 140 may include a two-dimensional pixel array such as, but not limited to, a charge-coupled device (CCD) or a complementary metal-oxide semiconductor (CMOS) device. In this regard, the detector 140 may generate a two-dimensional image (e.g., a field-plane image or a pupil-plan image) in a single measurement.

In one embodiment, the detector 140 includes one or more detectors 140 suitable for characterizing a moving sample (e.g., a scanned sample). In this regard, the imaging tool 122 may operate in a scanning mode in which the sample 128 is scanned with respect to a measurement field during a measurement. For example, the detector 140 may include a 2D pixel array with a capture time and/or a refresh rate sufficient to capture one or more images during a scan within selected image tolerances (e.g., image blur, contrast, sharpness, or the like). By way of another example, the detector 140 may include a line-scan detector to continuously generate an image of one line of pixels at a time. By way of another example, the detector 140 may include a time-delay integration (TDI) detector.

In another embodiment, the imaging tool 122 includes a controller 152. The controller 152 may include one or more processors 154 configured to execute program instructions maintained on memory medium 156, or memory. In this regard, the one or more processors 154 of controller 152 may execute any of the various process steps described throughout the present disclosure. Further, the controller 152 may be communicatively coupled to the imaging tool 122 or any component therein.

In another embodiment, the imaging tool 122 includes a scanning sub-system to scan the sample 128 with respect to the measurement field during a metrology measurement. For example, the sample stage 138 may position and orient the sample 128 within a focal volume of the objective lens 136. In another embodiment, the sample stage 138 includes one or more adjustable stages such as, but not limited to, a linear translation stage, a rotational stage, or a tip/tilt stage. In another embodiment, though not shown, the scanning sub-system includes one or more beam-scanning optics (e.g., rotatable mirrors, galvanometers, or the like) to scan the illumination beam 126 with respect to the sample 128.

The illumination pathway 130 and the collection pathway 142 of the imaging tool 122 may be oriented in a wide range of configurations suitable for illuminating the sample 128 with the illumination beam 126 and collecting light emanating from the sample 128 in response to the incident illumination beam 126. For example, as illustrated in FIG. 1B, the imaging tool 122 may include a beamsplitter 148 oriented such that a common objective lens 136 may simultaneously direct the illumination beam 126 to the sample 128 and collect light from the sample 128. By way of another example, the illumination pathway 130 and the collection pathway 142 may contain non-overlapping optical paths.

In one embodiment, imaging tool 122 may include one or more aberration correction plates 110 (e.g., 118a and 120a of FIG. 1B, or 110a and 110b of FIG. 1A) for at least partially correcting for aberration terms. For example, as described above, the one or more aberration correction plates 110 may be selected from a catalog 114.

In another embodiment, one or more aberration correction plates 110 may be placed in one or more pupil planes of imaging tool 122 and may be configured to at least partially correct aberrations of the imaging tool 122. For example, a first aberration correction plate 110 may be configured to be used in a first pupil plane and a second aberration correction plate 110 may be configured to be used in a second pupil plane. For example, a first aberration correction plate 110 and a second aberration correction plate 110 may be configured to be used in a first pupil plane. For instance, a first aberration correction plate 110 and a second aberration correction plate 110 may be configured to be used next to, and on either side of a pupil plane.

It is contemplated herein that the design of a particular optical system 100 may limit the thickness of an aberration correction plate 110 or number of aberration correction plates 110 that may be placed at a particular pupil plane or sufficiently close to a particular pupil plane to provide aberration correction within a selected tolerance. For example, the thickness of an aberration correction plate 110 may be relatively thin (e.g., 0.5 mm or less). For instance, the thickness of an aberration correction plate 110 may be as thin as possible and the thinness of the aberration correction plate 110 may be limited, in part, due to a polishing process used to manufacture the aberration correction plate 110.

For the purposes of the present disclosure, descriptions indicating a placement of one or more aberration correction plates in a pupil plane may be understood as placement of one or more aberration correction plates within a range of distances from the pupil plane that provides aberration correction within a selected tolerance. It is noted that a collimated light wave may allow for an equal amount of aberration correction within a selected tolerance at a range of distances (e.g., up to 15 cm or more) past a pupil plane. For example, an optical system with a complex objective (e.g., having many optical elements) with a pupil plane in the objective may not, for various reasons (i.e., not enough space), be able to have an aberration correction plate located in the objective. For instance, the aberration correction plate may need to be placed outside the objective (e.g., 10 cm from/past the pupil plane). In this regard, a wide range of placements of an aberration correction plate may allow for aberration correction within a selected tolerance if the light wave transmitted through the objective is collimated by the objective when a test object, e.g., a reticle, is placed at the front focal plane of the objective. For the purposes of the present disclosure, the "range" term in the phrase "within a range of distances from the pupil plane that provides aberration correction within a selected tolerance" may vary depending upon whether the light wave is collimated past the pupil plane and to what degree the light wave is collimated past the pupil plane.

For the purposes of the present disclosure, descriptions indicating two or more corrections plates (e.g., aberration correction plates) may be understood to be one or more correction plates (e.g., aberration correction plates) if the aberration type of at least one of the one or more correction plates is one of astigmatism, coma, or trefoil aberration. For example, a single coma aberration correction plate provided using the equations and other properties described below associated with Z7 and Z8 and which may be referenced in regards to FIG. 5A and FIG. 5B may be provided instead of providing two or more aberration correction plates in method step 204. Further, for the purposes of the present disclosure, descriptions indicating two or more sets of a catalog may be understood to be one or more sets of a catalog if the aberration type of at least one correction plate of the one or more sets is one of astigmatism, coma, or trefoil aberration.

Further, the optical system may include any number of optical relays to provide any number of conjugate pupil planes at which aberration correction plates may be placed. In this way, descriptions indicating a placement of one or more aberration correction plates in a pupil plane herein may be understood to include any arrangement of aberration correction plates in any number of conjugate pupil planes.

Figure 2:
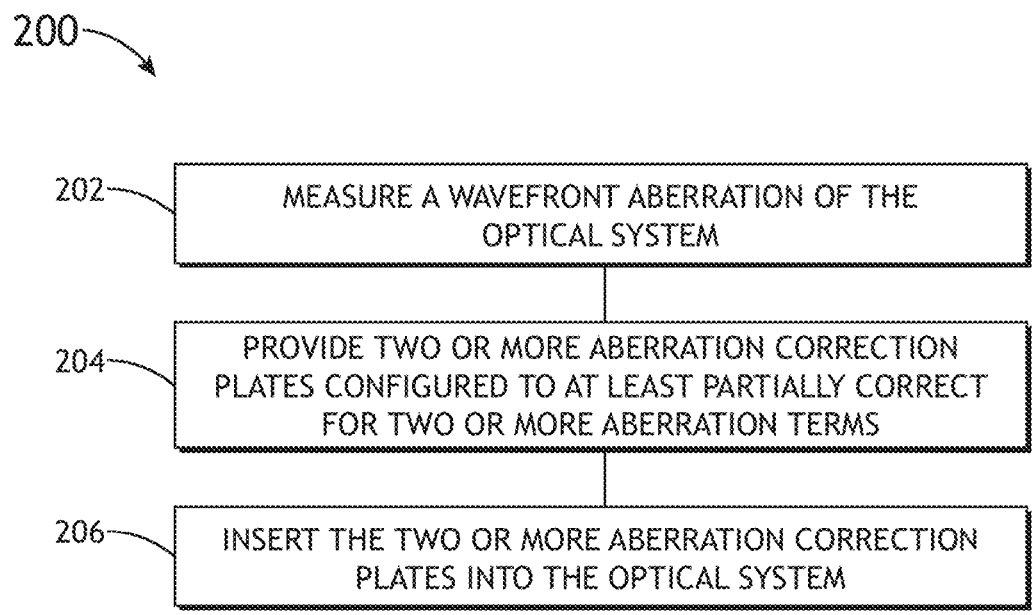
FIG. 2 illustrates a flow diagram depicting a method or process for correcting aberration of an optical system, in accordance with one or more embodiments of the present disclosure.

FIG. 2 generally illustrates a method for correcting aberration of an optical system, in accordance with one or more embodiments of the present disclosure.

In a step 202, a wavefront aberration of the optical system may be measured. For example, a wavefront of an optical system may become distorted by virtue of the elements in the imaging optics of the system or by the design of the system and such a distortion may be measured. For instance, referring to FIG. 1A, the imaging optics 104 may cause wavefronts 108 to become distorted, (see distorted wavefronts 112a). Further, in this instance, distorted wavefronts 112a (i.e., wavefront aberration) may be measured. For example, in a UV to visible wavelength range optical system, aberration may be measured using a Shack-Hartmann sensor. In another example, in an EUV actinic system, aberration may be determined by use of a phase-shifting point-diffraction interferometer as described further in "Extreme-ultraviolet phase-shifting point-diffraction interferometer: a wave-front metrology tool with subangstrom reference-wave accuracy" by Patrick P. Naulleau et al, Applied Optics, Vol. 38, No. 35, 10 Dec. 1999, which paper is incorporated herein by reference in its entirety. Additionally, several examples for determining aberration in an EUV type system are further described in U.S. Pat. No. 9,335,206, issued 10 May 2016, by Zhang et al., which patent is incorporated herein by reference in its entirety.

In an optional step, the method 200 may include fitting the measured wavefront aberration into linearly independent aberration terms. For example, the method 200 may include fitting the measured wavefront aberration 112b into linearly independent Zernike polynomials or terms.

In a step 204, two or more aberration correction plates 110 (e.g., aberration correction plate 110a and aberration correction plate 110b) configured to at least partially correct for two or more aberration terms may be provided. For example, a first aberration correction plate 110a configured to at least partially correct for a first aberration term of a plurality of aberration terms may be provided. Further, each of the plurality of aberration terms may be configured to be linearly independent from each other and characterize a type of aberration. For instance, each of the plurality of aberration terms may be configured to characterize a type of aberration based on the measured wavefront aberration (e.g., 112a in FIG. 1A). Further, in regards to the above example, each aberration term of the two or more aberration terms may characterize a different type of aberration of the optical system 100.

In one example, a first type of aberration of a first aberration correction plate of the two or more aberration correction plates and a second type of aberration of a second aberration correction plate of the two or more aberration correction plates may be one of astigmatism, coma, spherical aberration, or trefoil aberration. In another example, a first type of aberration of a first aberration correction plate of the two or more aberration correction plates and a second type of aberration of a second aberration correction plate of the two or more aberration correction plates may be one of any Zernike term, including high order Zernike terms.

One example of providing an aberration correction plate 110 (e.g., a first aberration plate 110a) may include at least partially correcting for two Zernike terms simultaneously with the same plate when the Zernike terms are of the same aberration type. For instance, the fifth Zernike term (Z5) and sixth Zernike term (Z6) may be associated with astigmatism and the aberration correction plate 110 may be desired to correct for astigmatism. Any combination of Z5 and Z6 may be a wavefront of Z5 with an amplitude equal to the square Root of Sum of Squares RSS of Z5 and Z6, but rotated to an angle which is determined by the Zernike coefficients of Z5 and Z6. This may likewise be true for the seventh and eighth Zernike terms (Z7 and Z8, respectively), and the tenth and eleventh Zernike terms (Z10 and Z11, respectively). In this regard, such a property may be used to provide an aberration correction plate 110 that corrects for two Zernike terms associated with the same type of aberration.

For example, in FIG. 3A, an astigmatism wavefront 300 with a wavefront aberration type of astigmatism for Z5 is shown. The color (e.g., the shade of grey used) of the astigmatism wavefront 300 corresponds to the wavefront aberration level, where a medium-grey (as shown in the corners) indicates zero aberration. An astigmatism correction plate 110 may be provided to correct for (i.e., cancel out) such an astigmatism wavefront 300 if the aberration correction plate 110 has a 2D thickness profile that is proportional to $-w(x, y)/(n-1)$ on top of a constant thickness uniform substrate, where $w(x, y)$ is a 2D wavefront phase function and n is the refractive index of the plate material. This may mean that positive phase (defined as longer optical path length) gives smaller thickness and vice versa. These properties may hold true for other aberration terms (e.g., Z7 and Z8, and Z10 and Z11). When such an astigmatism correction plate is provided, the projected fifth Zernike term (Z5) and sixth Zernike term (Z6) in XYZ coordinates may follow sinusoidal functions:

$$\begin{bmatrix} Z5 \\ Z6 \end{bmatrix} = \begin{bmatrix} \cos 2\theta & -\sin 2\theta \\ \sin 2\theta & \cos 2\theta \end{bmatrix} \begin{bmatrix} Z5_0 \\ 0 \end{bmatrix}$$

where $\theta$ is a rotation angle about the Z axis of FIG. 3A and measured from 0 to $\pi$ and $Z5_0$ is the amplitude of the correction plate.

Figure 4A:
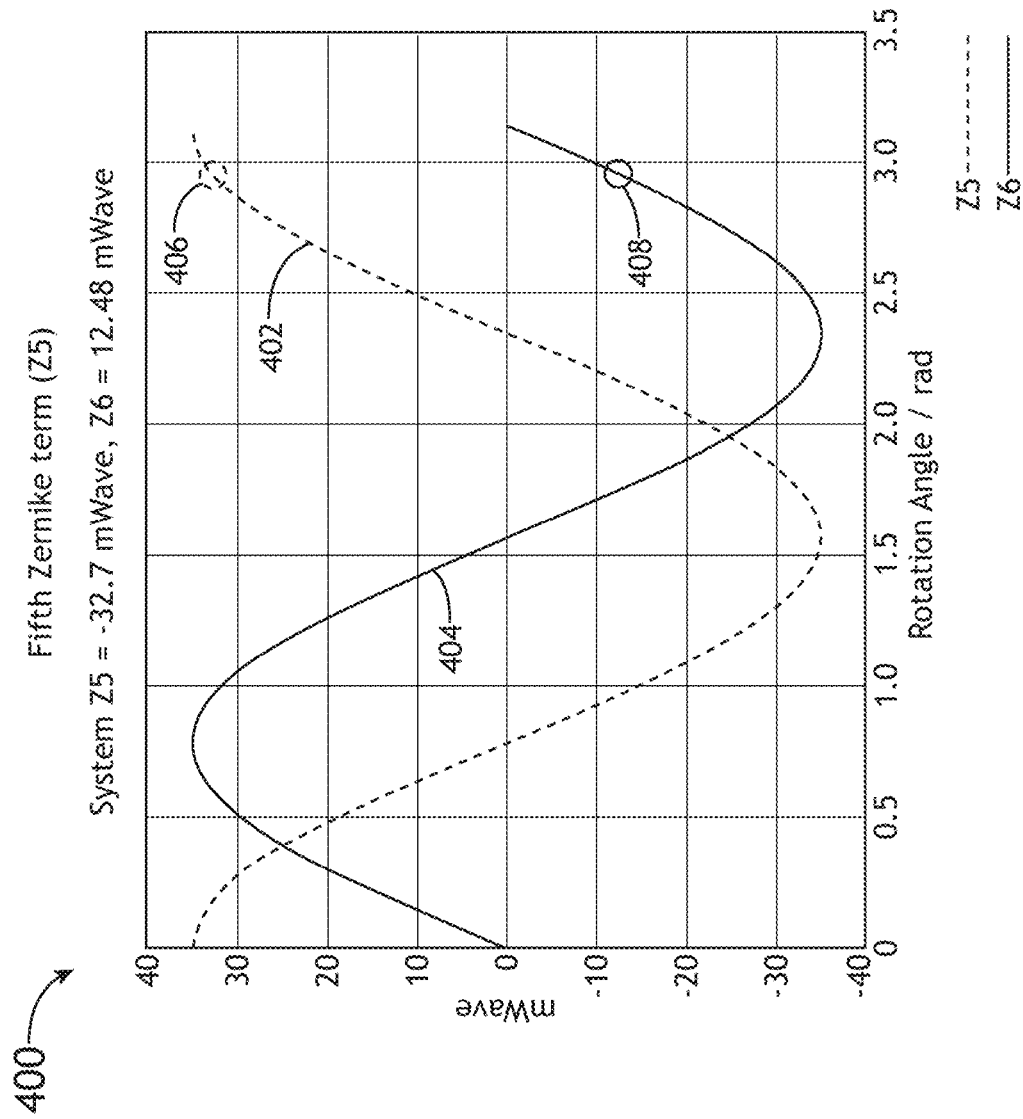
FIG. 4A illustrates a graphical representation of sinusoidal projections of an example fifth Zernike term and sixth Zernike term, in accordance with one or more embodiments of the present disclosure.
Figure 4B:
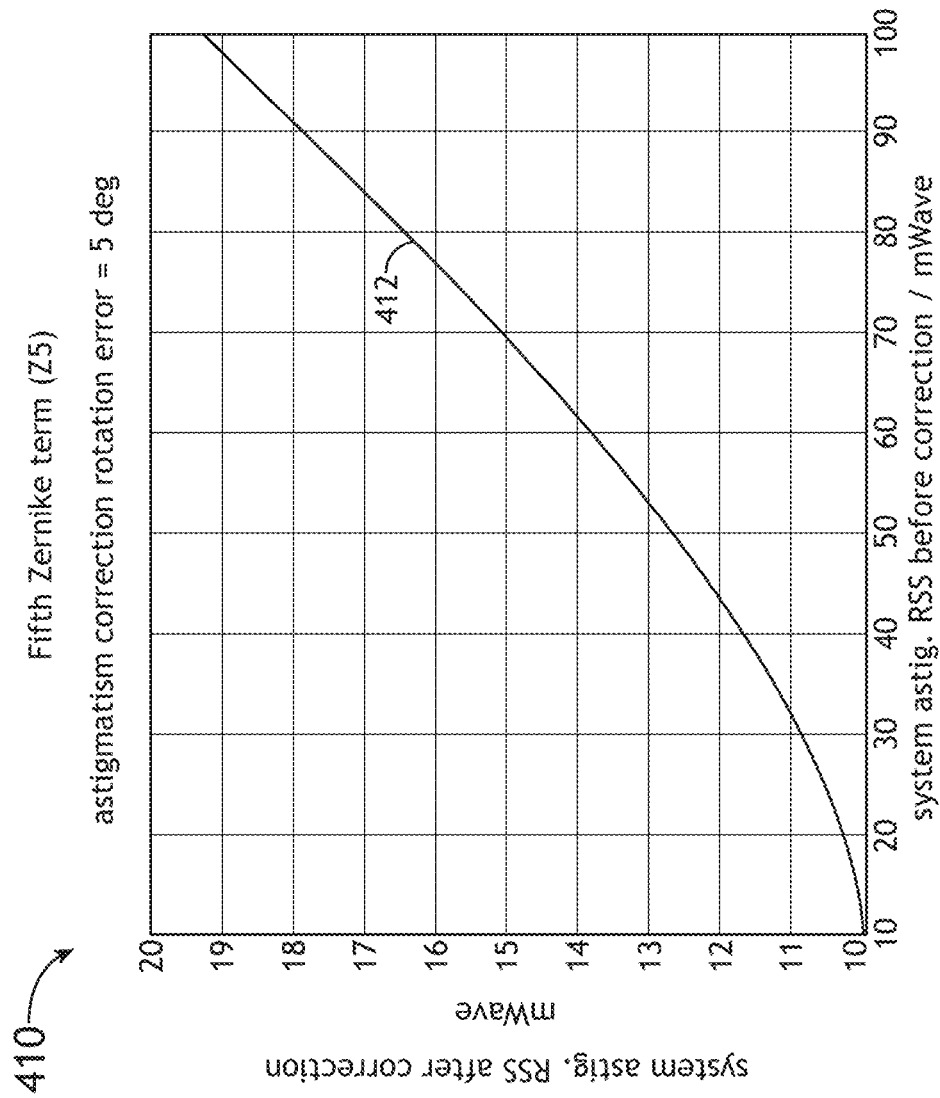
FIG. 4B illustrates a graphical representation of simulated residual astigmatism RSS values after aberration correction with an imperfect aberration correction plate, in accordance with one or more embodiments of the present disclosure.

An instance of the above example can be seen in FIG. 4A and FIG. 4B. FIG. 4A shows an illustration of an instance of Z5 402 and Z6 404. Rotation of an astigmatism correction plate, as described above, generates sinusoidal Z5 402 and Z6 404 projections versus the rotation angle. In this instance, in a 2D plane with horizontal axis Z5 and vertical axis Z6, the coordinate of the system of FIGS. 4A and 4B is as follows: the measured system astigmatism Z5 is $-32.7$ mWave, the measured Z6 is 12.48 mWave. Further, RSS is 35 mWave, and the Z5 amplitude of the astigmatism correction plate is 35 mWave (as shown by the maximum height of Z5 402 in FIG. 4A). In this instance, the azimuthal angle $\varphi$ (e.g., in a range of 0 to 2π) is 159.09 degrees, and the projected Z5 and Z6 are 32.7 (shown by Z5 point 406) and $-12.48$ (shown by Z6 point 408), respectively (i.e., which are opposite to the system astigmatism and cancelling system astigmatism). Generally, for azimuthal angle $\varphi$ in the range of 0 to $\pi$, the correct rotation angle (e.g., rotation angle of the aberration correction plate about an optical axis of an optical system) is $\theta=(\varphi+\pi)/2$ and for azimuthal angle $\varphi$ in the range of $\pi$ to $2\pi$, the correct rotation angle is $\theta=(\varphi-\pi)/2$. In this instance, when the rotation angle of the aberration correction plate is rotated to $(159.09+180)/2=169.55$ degree (2.96 rad), system astigmatism Z5 and Z6 are corrected completely by the astigmatism correction plate of amplitude 35 mWave. This example shows system astigmatism may be corrected, at least in some embodiments, if the amplitude of the astigmatism correction plate 110 for Z5 is equal to the RSS of both Z5 and Z6 terms of astigmatism (i.e., system astigmatism).

However, when the Z5 amplitude of the astigmatism correction plate is not the same as the RSS of system astigmatism, there may be residual astigmatism because the correction is not complete. Referring to FIG. 4B and the above-described instance, system astigmatism RSS value is in the range from 10 to 100 mWave. It is noted that an astigmatism correction plate in a library of intervals of 20 mWave should not, in theory, have an astigmatism correction plate that is more than 10 mWave from the ideal value. In this regard, FIG. 4B illustrates a simulation of the residual astigmatism RSS values after correction by an astigmatism correction plate with a 10 mWave and with a 5 degree rotation angle error.

The residual astigmatism of FIG. 4B may be represented by the following function: $\Delta_A^2=(A_s-A_c)^2+2A_sA_c(1+\cos(2\theta-\varphi_s))$, where $A_s$ is the system astigmatism, $\varphi_s$ is the azimuthal angle in Z5Z6 plane, $A_c$ is the Z5 amplitude of the astigmatism correction plate, $\theta$ is the rotation angle, and $\Delta_A$ is the RSS of residual astigmatism after correction by the astigmatism correction plate. For a theoretical perfect correction of astigmatism, both $A_c=A_s$ and $\cos(2\theta-\varphi_s)=-1$. If $A_c \neq A_s$, in some embodiments, the rotation angle $\theta$ which gives the smallest residual astigmatism satisfies the function $\cos(2\theta-\varphi_s)=-1$, such that the second term of the above equation, $2A_sA_c(1+\cos(2\theta-\varphi_s))$, is equal to zero.

Similar to the above instances and examples associated with astigmatism, aberration correction plates 110 associated with coma (i.e., Z7 and Z8), and trefoil aberration (i.e., Z10 and Z11) may be similarly provided and/or have similar properties. For example, for coma, the required rotation range is from 0 to $2\pi$. For trefoil, the required rotation range is from 0 to $(\frac{2}{3})\pi$. For example, the RSS of Z7 and Z8 may be used to determine the amplitude of an aberration correction plate 110 associated with coma and the angle of such an aberration correction plate 110 may similarly be determined based on the Zernike coefficients of the associated Zernike terms.

For example, similar to the instance described above for Z5 and Z6, providing an aberration correction plate for coma may be similar to providing an aberration correction plate for astigmatism as described above. For instance, for coma, projected Z7 and Z8 terms in the XYZ coordinate system may follow sinusoidal functions:

$$\begin{bmatrix} Z7 \\ Z8 \end{bmatrix} = \begin{bmatrix} \cos\theta & -\sin\theta \\ \sin\theta & \cos\theta \end{bmatrix} \begin{bmatrix} Z7_0 \\ 0 \end{bmatrix}$$

where $\theta$ is a rotation angle about the Z axis of FIG. 3B and measured from 0 to $2\pi$ and $Z7_0$ is the amplitude of the correction plate.

Figure 5A:
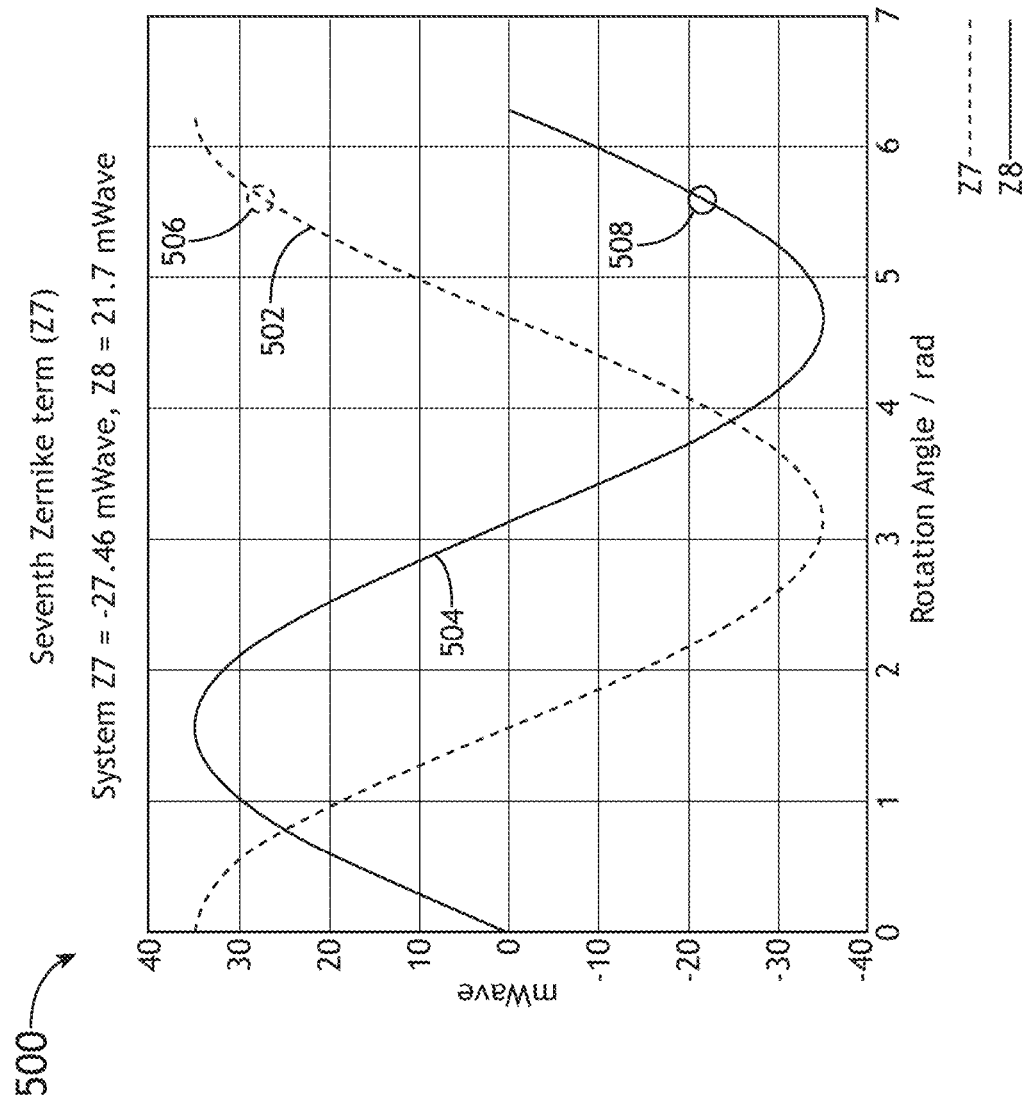
FIG. 5A illustrates a graphical representation of sinusoidal projections of an example seventh Zernike term and eighth Zernike term, in accordance with one or more embodiments of the present disclosure.
Figure 5B:
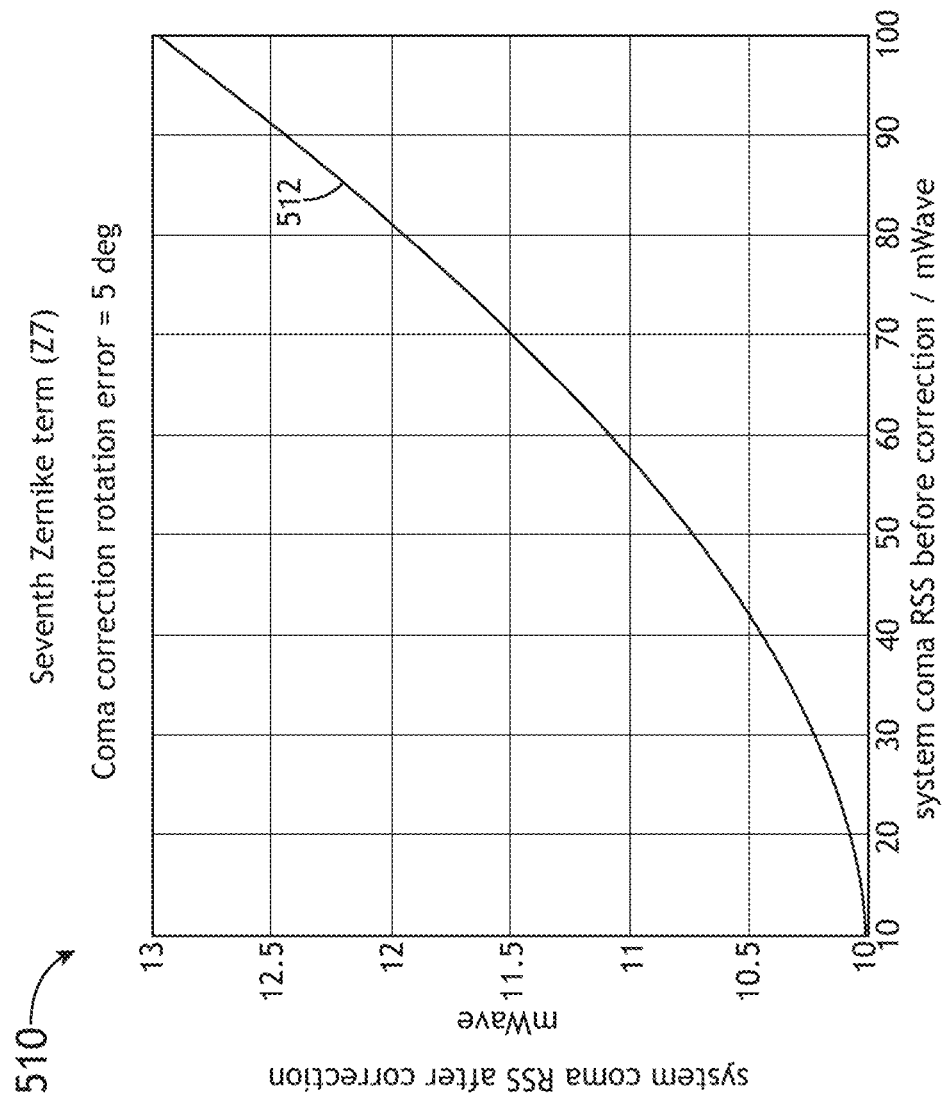
FIG. 5B illustrates a graphical representation of simulated residual coma RSS values after aberration correction with an imperfect aberration correction plate, in accordance with one or more embodiments of the present disclosure.

An instance of the above example can be seen in FIG. 5A and FIG. 5B. FIG. 5A shows an illustration of an instance of Z7 502 and Z8 504. Rotation of a coma correction plate, as described above, generates sinusoidal Z7 502 and Z8 504 projections versus the rotation angle. In this instance, in a 2D plane with horizontal axis Z7 and vertical axis Z8, the coordinate of the system of FIGS. 5A and 5B is as follows: the measured system coma Z7 is $-27.46$ mWave, the measured Z8 is 21.7 mWave. Further, RSS is 35 mWave, and the Z7 amplitude of the coma correction plate is 35 mWave (as shown by the maximum height of Z7 502 in FIG. 5A). In this instance, the azimuthal angle $\varphi$ (e.g., in a range of 0 to $2\pi$) is 141.68 degrees, and the projected Z7 and Z8 are 27.46 (shown by Z7 point 506) and $-21.7$ (shown by Z8 point 508), respectively (i.e., which are opposite to the system coma and cancelling the system coma). Generally, for azimuthal angle $\varphi$ in the range of 0 to $\pi$, the correct rotation angle (e.g., rotation angle of the aberration correction plate about an optical axis of an optical system) is $\theta=\varphi+\pi$ and for azimuthal angle φ in the range of π to 2π, the correct rotation angle is θ=φ−π. In this instance (FIG. 5A), when the rotation angle of the aberration correction plate is rotated to 141.68+180=321.68 degrees (5.61 rad), system coma Z7 and Z8 are corrected completely by the coma correction plate of amplitude 35 mWave. This example shows system coma may be corrected, at least in some embodiments, if the amplitude of the coma correction plate 110 for Z7 is equal to the RSS of both Z7 and Z8 terms of coma (i.e., system coma).

However, when the Z7 amplitude of the coma correction plate is not the same as the RSS of system coma, there may be residual coma because the correction is not complete. Referring to FIG. 5B and the above-described instance, system coma RSS value is in the range from 10 to 100 mWave. It is noted that a coma correction plate in a library of intervals of 20 mWave should not, in theory, have a coma correction plate that is more than 10 mWave from the ideal value. In this regard, FIG. 5B illustrates a simulation of the residual coma RSS values after correction by a coma correction plate with a 10 mWave and with a 5 degree rotation angle error.

The residual coma of FIG. 5B may be represented by the following function: $\Delta_C^2=(C_s \cdot C_c)^2+2C_s C_c(1+\cos(\theta-\psi_s))$, where $C_s$ is system coma, $\psi_s$ is the azimuthal angle in the Z7Z8 plane, $C_c$ is Z7 amplitude of the coma correction plate, θ is the rotation angle, and $\Delta_C$ is the RSS of residual coma after correction. For a theoretical perfect correction of coma, both $C_c=C_s$ and $\cos(\theta-\psi_s)=-1$. If $C_c \neq C_s$, in some embodiments, the rotation angle θ which gives the smallest residual coma satisfies the function $\cos(\theta-\psi_s)=-1$, such that the second term of the above equation, $2C_s C_c(1+\cos(\theta-\psi_s))$, is equal to zero.

In another instance, for trefoil aberration, projected Z10 and Z11 terms in the XYZ coordinate system may follow sinusoidal functions:

$$\begin{bmatrix} Z10 \\ Z11 \end{bmatrix} = \begin{bmatrix} \cos(3\theta) & -\sin(3\theta) \\ \sin(3\theta) & \cos(3\theta) \end{bmatrix} \begin{bmatrix} Z10_0 \\ 0 \end{bmatrix}$$

where θ is a rotation angle about a Z axis and measured from 0 to (⅔)π and $Z10_0$ is the amplitude of the correction plate.

By using quartz material and IBF technology, the Zernike term purity of a thin (e.g. 0.5 mm thick) Z5 aberration correction plate 110 may be very high. The amplitude of other Zernike terms may be as small as about 1 mWave.

In FIG. 3B a coma wavefront 302 with a wavefront aberration type of coma for Z9 is shown for illustrative purposes.

By using quartz or fused silica material and IBF technology, the Zernike term purity of a thin (e.g. 0.5 mm thick) Z7 aberration correction plate 110 may be very high. The amplitude of other Zernike terms may be as small as about 1 mWave.

In FIG. 3C a spherical aberration wavefront 304 with a wavefront aberration type of spherical aberration for the ninth Zernike term (Z9), which may be rotationally symmetric, is shown for illustrative purposes. For example, for a Z9 aberration correction plate 110 that corrects for spherical aberration, no rotation of the plate is necessary.

In an optional step (not shown), at least one of the two or more aberration correction plates may be configured to correct for apodization. For example, one or more of the aberration correction plates 110 of optical system or imaging tool 122 may be an aberration correction plate 110 that is configured to correct for apodization (e.g., a non-uniform pupil intensity distribution). For instance, an aberration correction plate 110 (e.g., aberration correction plate 110a of FIG. 1A) may be configured to correct for apodization using a coating (on at least one of a first surface (not shown) or a second surface (not shown) of the aberration correction plate 110) that may improve the uniformity of a pupil transmission of the optical system. In this regard, the aberration correction plate coating may be configured to reduce the pupil transmission by a value (e.g., 10% lower) near the center of the aberration correction plate. In another instance, each aberration correction plate of an optical system 100 (e.g., imaging tool 122) may have a coating that corrects for apodization (i.e., apodization coating). A benefit of one or more correction plates that correct for both apodization and aberration is an optical system with both apodization and aberration correction. In another example, the apodization coating may be rotationally symmetric. It is noted that apodization as described in the examples and instances above is for illustrative purposes only.

Even though apodization is not the same as aberration, it is noted that at least in some embodiments that any aberration correction plate mentioned may instead be an apodization correction plate. For example, any aberration correction plate may be an apodization plate that corrects for apodization but that does not correct for any aberration terms. For instance, aberration correction plate 110a of FIG. 1A or aberration correction plate 118a of FIG. 1B may be an apodization correction plate that corrects for apodization but does not correct for any aberration terms. In another instance, catalog 114 of aberration correction plates may be a catalog of aberration and apodization correction plates or a catalog of only apodization correction plates. In this regard, set 116a may be a set of aberration correction plates 118 and set 116b may be a set of apodization correction plates, where set 116a corrects for an aberration term and set 116b corrects for a range of apodization values. In another regard, or in addition to the above regard, any aberration correction plate may be an aberration and apodization correction plate that corrects for both apodization and aberration. For example, set 116a may be a set of aberration and apodization correction plates 118.

Referring back to FIG. 2, in an optional step 206, the two or more aberration correction plates may be inserted into the optical system. For example, referring to FIG. 1A, the first aberration correction plate 110a and the second aberration correction plate 110b may be the two or more aberration correction plates and may be inserted into the optical system 100 or into the imaging tool 122. For instance, the first aberration correction plate 110a and the second aberration correction plate 110b may be inserted at the pupil plane (not shown) of the system 100. In this regard, the optical system 100 may have one or more pupil planes and one or more aberration correction plates 110 may be inserted into the one or more pupil planes of the optical system 100. For example, one or two aberration correction plates 110 of the two or more aberration correction plates 110 may be inserted at each pupil plane. In another example, each aberration correction plate 110 of the total amount of aberration correction plates 110 is inserted in a different pupil plane of the optical system 100. For example, aberration correction plates 110 that are not rotationally symmetric (which may include aberration correction plates associated with astigmatism or coma) may be inserted into an optical axis of the optical system 100 at a rotational angle that such an aberration correction plate 144 is configured to be in to at least partially correct for the aberration term that it is associated with. In another example, aberration correction plates 110 that are rotationally symmetric (which may include aberration correction plates associated with spherical aberration) may be inserted into an optical axis of the optical system 100 at any rotational angle about the optical axis.

All of the methods described herein may include storing results of one or more steps of the method embodiments in memory. The results may include any of the results described herein and may be stored in any manner known in the art. The memory may include any memory described herein (e.g., memory 156) or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein (e.g., controller 152 of imaging tool 122).

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "front," "back," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

We claim:

1. An optical system with aberration correction, the optical system comprising:
   an illumination source;
   a detector;
   one or more collection optics configured to image a sample onto the detector based on illumination from the illumination source; and
   two or more aberration correction plates located in one or more pupil planes of the one or more collection optics and providing at least partial correction of two or more linearly-independent aberration terms, wherein any particular one of the two or more aberration correction plates has a spatially-varying thickness profile providing a selected amount of correction for a single particular aberration term of the two or more linearly-independent aberration terms.

2. The optical system of claim 1, wherein the system further comprises at least one apodization correction plate configured to at least partially correct for apodization.

3. The optical system of claim 1, wherein at least one of the two or more aberration correction plates is configured to at least partially correct for apodization.

4. The optical system of claim 3, wherein the at least one of the two or more aberration correction plates are configured to at least partially correct for apodization because the at least one of the two or more aberration correction plates comprise an apodization coating configured to radially vary transmissivity according to a radially varying function with increasing transmissivity from a center of a pupil of the optical system relative to an outer edge of the pupil when the at least one aberration correction plate is located at a pupil plane of the optical system.

5. The optical system of claim 1, wherein the two or more aberration correction plates comprise a first aberration correction plate configured to at least partially correct for a first aberration term, the first aberration term characterizing a first type of aberration, and a second aberration correction plate configured to at least partially correct for a second aberration term, the second aberration term characterizing a second type of aberration,
   wherein at least one of the first type of aberration or the second type of aberration are one of astigmatism, coma, spherical aberration, or trefoil aberration.

6. The optical system of claim 5, wherein the two or more aberration correction plates further comprise a third aberration correction plate configured to at least partially correct for a third aberration term of the two or more linearly-independent aberration terms, the third aberration term characterizing a third type of aberration of the optical system, wherein the third type of aberration, the second type of aberration, and the first type of aberration are different.

7. The optical system of claim 6, wherein the third type of aberration is spherical aberration.

8. The optical system of claim 5, wherein the first aberration correction plate is configured to at least partially correct for the first aberration term when the first aberration correction plate is located at the one or more pupil planes of the optical system and the second aberration correction plate is configured to at least partially correct for the second aberration term when the second aberration correction plate is located at the one or more pupil planes of the optical system.

9. The optical system of claim 5, wherein the first aberration correction plate is configured to at least partially correct for the first aberration term when the first aberration correction plate is located at a first pupil plane of the one or more pupil planes and the second aberration correction plate is configured to at least partially correct for the second aberration term when the second aberration correction plate is located at a second pupil plane of the one or more pupil planes, which is different than the first pupil plane.

10. The optical system of claim 1, wherein each of the two or more linearly-independent aberration terms are Zernike terms.

11. The optical system of claim 1, wherein each of the two or more linearly-independent aberration terms are low order Zernike terms spanning a fifth Zernike term up to and including a ninth Zernike term.

12. The optical system of claim 1, wherein the optical system is an imaging tool.

13. The optical system of claim 1, wherein any aberration correction plate comprising an aberration term characterizing an aberration type of astigmatism, coma, or trefoil aberration is configured to be rotated to align with an orientation of the aberration type in the optical system.

14. The optical system of claim 1, wherein any aberration correction plate located in one or more pupil planes is located within a distance range from the one or more pupil planes, wherein the distance range is configured to provide aberration correction within a selected tolerance.

15. A system with aberration correction, the system comprising
   an optical system with aberration correction, the optical system comprising
      an illumination source;
      a detector; and
      one or more collection optics configured to image a sample onto the detector based on illumination from the illumination source; and
   a catalog of aberration correction plates comprising:
      two or more sets, each set of the two or more sets comprising:
         two or more aberration correction plates providing at least partial correction of a specific linearly-independent aberration term, wherein any particular one of the two or more aberration correction plates has a spatially-varying thickness profile providing a selected amount of correction for the specific linearly-independent aberration term of two or more linearly-independent aberration terms, wherein each set corrects for a different specific linearly-independent aberration term,
   wherein:
      the optical system includes a selected combination of two or more aberration correction plates to at least partially correct for aberrations within a selected tolerance; and
      each aberration correction plate of the selected combination is an aberration correction plate from one of the two or more sets.

16. The system of claim 15, wherein the catalog further comprises an apodization set configured to at least partially correct for apodization and the selected combination includes an apodization correction plate of the apodization set.

17. The system of claim 15, wherein at least one aberration correction plate of the selected combination is configured to at least partially correct for apodization.

18. The system of claim 15, wherein at least one aberration correction plate is configured to at least partially correct for apodization because the at least one aberration correction plate comprises an apodization coating configured to radially vary transmissivity according to a radially varying function with increasing transmissivity from a center of a pupil of the optical system relative to an outer edge of the pupil when the at least one aberration correction plate is located at a pupil plane of the optical system.

19. The system of claim 15, wherein the selected combination is adjustable to provide for different configurations of the optical system.

20. The system of claim 15, wherein the optical system is an imaging tool.

21. The system of claim 15, wherein the two or more linearly-independent aberration terms includes astigmatism.

22. The system of claim 15, wherein the two or more linearly-independent aberration terms includes coma.

23. A method of correcting aberration of an optical system, the method comprising:
determining a wavefront aberration of the optical system; and
providing two or more aberration correction plates for the optical system, each of the two or more aberration correction plates configured to at least partially correct for an aberration term of a plurality of aberration terms, each of the plurality of aberration terms configured to be linearly independent from each other and characterize a type of aberration, each aberration term characterizing a type of aberration of the optical system and being based on the determined wavefront aberration.

24. The method of claim 23, wherein at least one aberration correction plate of the two or more aberration correction plates is configured to at least partially correct for apodization.

25. The method of claim 23, wherein at least one aberration correction plate is configured to at least partially correct for apodization because the at least one aberration correction plate comprises an apodization coating configured to radially vary transmissivity according to a radially varying function with increasing transmissivity from a center of a pupil of the optical system relative to an outer edge of the pupil when the at least one aberration correction plate is located at a pupil plane of the optical system.

26. The method of claim 23, wherein the determining includes measuring the wavefront aberration of the optical system.

27. The method of claim 23, wherein the determining includes simulating the wavefront aberration of the optical system.

28. The method of claim 23, wherein each of the plurality of aberration terms are Zernike terms.

29. The method of claim 23, wherein the plurality of aberration terms include at least one of astigmatism, coma, spherical aberration, or trefoil aberration.

30. The method of claim 23, wherein a first type of aberration of a first aberration correction plate of the two or more aberration correction plates is one of astigmatism, coma, spherical aberration, or trefoil aberration.

31. The method of claim 30, wherein a second type of aberration of a second aberration correction plate of the two or more aberration correction plates is one of astigmatism, coma, spherical aberration, or trefoil aberration.

32. The method of claim 31, wherein the first type of aberration of the first aberration correction plate is astigmatism,
wherein an amplitude of the first aberration correction plate is based on a square root of sum of squares of a fifth Zernike term of astigmatism and a sixth Zernike term of astigmatism based on the determined wavefront aberration of the optical system, such that the first aberration correction plate is configured to at least partially correct for both the fifth Zernike term and the sixth Zernike term when located at a pupil plane of the optical system and rotated to align with an orientation of the first type of aberration in the optical system.

33. The method of claim 31, wherein the second type of aberration of the second aberration correction plate is coma,
wherein an amplitude of the second aberration correction plate is based on a square root of sum of squares of a seventh Zernike term of coma and an eighth Zernike term of coma based on the determined wavefront aberration of the optical system, such that the second aberration correction plate is configured to at least partially correct for both the seventh Zernike term and the eighth Zernike term when located at a pupil plane of the optical system and rotated to align with an orientation of the second type of aberration in the optical system.

34. The method of claim 23, wherein the optical system is an imaging tool.

35. The method of claim 23, wherein the method further comprises providing an apodization correction plate configured to at least partially correct for apodization.

36. An optical system with aberration correction, the optical system comprising:
an illumination source;
a detector;
one or more collection optics configured to image a sample onto the detector based on illumination from the illumination source; and
one or more aberration correction plates located in one or more pupil planes of the one or more collection optics and providing at least partial correction of one or more linearly-independent aberration terms, wherein any particular one of the one or more aberration correction plates has a spatially-varying thickness profile providing a selected amount of correction for a single particular aberration term of the one or more linearly-independent aberration terms,
wherein the one or more aberration correction plates comprise a first aberration correction plate configured to at least partially correct for a first aberration term, the first aberration term characterizing a first type of aberration, wherein the first type of aberration is one of astigmatism, coma, or trefoil aberration,
wherein any aberration correction plate comprising an aberration term characterizing an aberration type of astigmatism, coma, or trefoil aberration is configured to be rotated to align with an orientation of the aberration type in the optical system.

37. A system with aberration correction, the system comprising
an optical system with aberration correction, the optical system comprising
an illumination source;
a detector; and
one or more collection optics configured to image a sample onto the detector based on illumination from the illumination source; and a catalog of aberration correction plates comprising:
one or more sets, each set of the one or more sets comprising:
one or more aberration correction plates providing at least partial correction of a specific linearly-independent aberration term, wherein any particular one of the one or more aberration correction plates has a spatially-varying thickness profile providing a selected amount of correction for the specific linearly-independent aberration term of one or more linearly-independent aberration terms, wherein each set corrects for a different specific linearly-independent aberration term,
wherein each specific linearly-independent aberration term characterizes a type of aberration of one or more types of aberration, wherein each type of aberration of the one or more types of aberration is one of astigmatism, coma, or trefoil aberration,
wherein:
the optical system includes a selected combination of one or more aberration correction plates to at least partially correct for aberrations within a selected tolerance; and
each aberration correction plate of the selected combination is an aberration correction plate from one of the one or more sets,
wherein any aberration correction plate comprising an aberration term characterizing an aberration type of astigmatism, coma, or trefoil aberration is configured to be rotated to align with an orientation of the aberration type in the optical system.

38. A method of correcting aberration of an optical system, the method comprising:
determining a wavefront aberration of the optical system; and
providing one or more aberration correction plates for the optical system, each of the one or more aberration correction plates configured to at least partially correct for an aberration term of one or more aberration terms, each of the one or more aberration terms configured to be linearly independent from each other and characterize a type of aberration, each aberration term characterizing a type of aberration of the optical system and being based on the determined wavefront aberration,
wherein the one or more aberration correction plates comprise a first aberration correction plate configured to at least partially correct for a first aberration term, the first aberration term characterizing a first type of aberration, wherein the first type of aberration is one of astigmatism, coma, or trefoil aberration,
wherein any aberration correction plate comprising an aberration term characterizing an aberration type of astigmatism, coma, or trefoil aberration is configured to be rotated to align with an orientation of the aberration type in the optical system.

* * * * *